May 18, 1937.    G. H. HAAS    2,080,981
PROCESS AND APPARATUS FOR THE PRODUCTION OF LIME AND CARBON DIOXIDE
Filed July 15, 1936
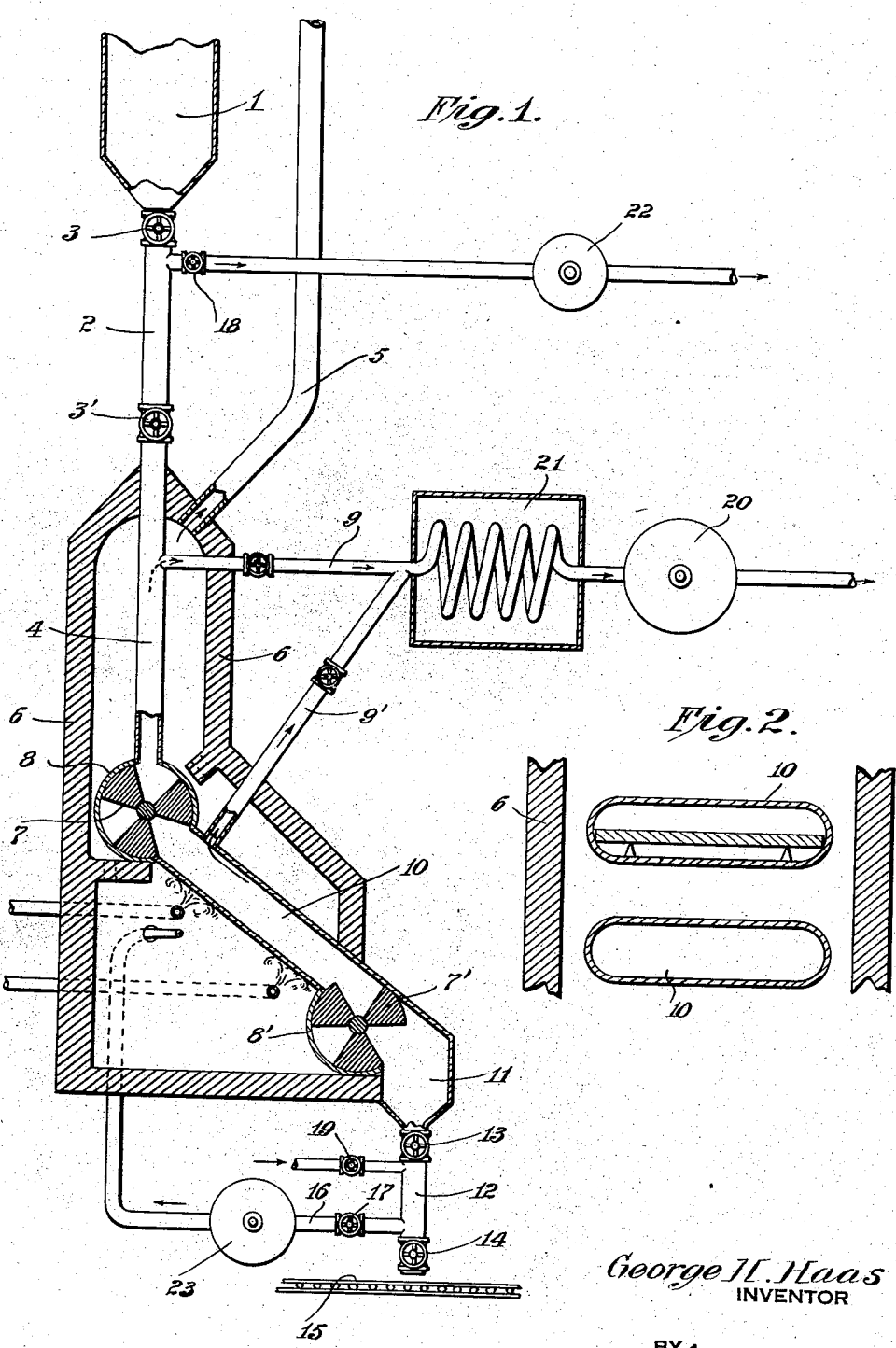
George H. Haas
INVENTOR Patented May 18, 1937

2,080,981

UNITED STATES PATENT OFFICE 2,080,981

PROCESS AND APPARATUS FOR THE PRODUCTION OF LIME AND CARBON DIOXIDE

George H. Haas, Lakeville, Conn.

Application July 15, 1936, Serial No. 90,637

5 Claims. (Cl. 263—29)

The primary object of burning limestone is to drive off the contained $CO_2$ gas, to reduce the limestone ($CaCO_3$) to the oxide (CaO) to obtain what is known as quick lime to be used for the making of mortar, for use in chemical processes etc. One measure or index of quality is the quantity of percentage of $CO_2$ gas which is left in the quick lime after calcination, another index is the slacking properties and plasticity of the lime. Quick lime containing relatively large amounts of $CO_2$ (from 10% to 25%) has very poor slacking qualities and plasticity is also poor, and this type of quick lime is not suitable for many chemical processes which require very low $CO_2$ content in the finished product.

Ordinary conventional kilns and rotary kilns (1) produce a quick lime high in $CO_2$ content, (2) require high degree of heat and long period of time for calcination, (3) the quick lime has inferior slacking and plasticity properties, (4) the high heat required causes some of the stone to fuse, (5) the $CO_2$ gas that is driven off is contaminated with the products of combustion, (6) small pieces of limestone cannot be used because of difficulty in getting proper draft, circulation and distribution of the heat thru the mass of stone, (7) conventional kilns permit the re-absorption of some of the $CO_2$ gas by the quick lime, and (8) the by-product pure $CO_2$ gas cannot be recovered in the most desirable form for industrial uses.

Some of the objects of my invention are,

1. To produce quicklime with a minimum $CO_2$ content.

2. To reduce the degree of heat required to effect full calcination and reduce the length of time required to effect full calcination and also reduce the amount of heat energy required.

3. To produce a quick lime of superior slacking quality, and superior plasticity, and preventing over- or under-burning.

4. To prevent all possibility of fusion of the quick lime.

5. To prevent mixing of the products of combustion with the pure $CO_2$ gas driven off the stone.

6. To provide an apparatus in which small pieces of stone (quarry waste and screenings) can be properly and economically calcined.

7. To prevent recarbonization taking place during or after the heating cycle or during the cooling of the quick lime.

8. To recover the pure uncontaminated $CO_2$ gas in highest concentration.

9. To accomplish these objectives economically with a minimum expenditure of heat and in the shortest possible time.

10. To provide a process which may be practically continuous.

My invention in its preferred form contemplates a conduit composed of a series of tubes or chambers of suitable size and shape and constructed of suitable material to withstand the degree of heat required to effect complete calcination, connected in series with welded or other gas-tight joints in such a manner that relatively high partial vacuum can be maintained on the limestone being treated thruout the entire heating cycle and arranged in such a manner that the limestone can be progressively fed thru the apparatus in such a manner that the temperature of the stone will be progressively raised without permitting any drop in temperature at any time during the heating cycle, and in such a manner that the pieces of stone cannot be superimposed on one another in the calcining stage but so that each piece of stone will receive the uninterrupted rays of heat from the source of heat. The tubes or chambers are connected by suitable pipes or ducts to maintain a partial vacuum on the tubes or chambers and are so arranged that the $CO_2$ gas evolved from the heating of the stone will be withdrawn in a direction counterflow to the direction of the progress of the stone thru the apparatus. I provide a means for continuously charging limestone into the apparatus and also removing the finished quicklime without stopping the operation and without contaminating the $CO_2$ gas with the products of combustion or reducing the concentration of the $CO_2$ gas by the admission of air, and provide for the cooling of the quicklime in an atmosphere of fresh air practically devoid of $CO_2$ gas, and handle the small pieces of stone thru the apparatus in such a manner as to avoid materially reducing the size of the particles or the formation of a large percentage of "fines" or powder.

The apparatus can be more clearly described as having an introductory stage a three stage kiln composed of preheater stage, calcining stage, and cooling stage and is shown in the preferred form in the accompanying drawing in which parts are numbered.

Fig. 1 shows a side elevation and section of the apparatus in diagram.

Fig. 2 shows a section of a furnace.

I represents the storage bin for fresh limestone, the bottom of which is conical to facilitate the feeding of the stone by gravity to the valve locked introductory chamber 2 having valves 3 and 3' located at the top and bottom of chamber 2. 4 represents the preheater chamber which is surrounded by and heated with the waste heat from the combustion chamber of furnace 6 and is of a suitable size to maintain a sufficient quantity of stone in the preheater for a period of time long enough to raise it to the desired temperature before feeding the stone into the main calcining stage. 5 is a combustion stack provided to discharge the gaseous products of combustion to atmosphere and can be of a size and height to provide natural draft or can be equipt with a blower of suitable size to maintain forced draft. The furnace 6 has walls and insulation around the preheating stage to prevent heat losses. 7 is a valve or pocketed wheel which is revolved on a fixed time schedule which valve or pocketed wheel is enclosed in a gas tight housing 8 and mounted on watercooled bearings equipt with stuffing box seal to prevent escape of gas or intake of air. 9 and 9' are suitable pipes or ducts connected with a suitable suction pump to maintain partial vacuum on the preheating tube and the calcining stage. Arrows denote direction of the flow of the evolved gas. 10 is the calcining stage which is a tube made of suitable material to withstand the heat necessary for calcination and can be of any length or cross section and one or more may be mounted inside the brick work as desired to increase the capacity of the kiln. 10 is connected to a gas tight housing 8' of similar construction as 8 in which a pocketed wheel or valve 7' similar to 7 is mounted for discharging the finished quick lime from the calcining stage into reserve pocket 11 and said reserve pocket 11 communicates with cooling chamber 12 by means of valve 13. Located in the bottom of the cooling chamber 12 is valve 14 which is used to control discharge of the finished quick lime onto conveyor 15 which carries the finished lime to cars or storage bins for bagging or for further treatment in hydrator as is desired. 16 is a tube connected to a secondary vacuum system which is used to eliminate such air as enters the cooling chamber during the momentary opening of valve 14 when the finished lime is discharged. Tube 16 is furnished with automatically operated valve 17 which operates as a check valve during the time when valve 13 is open to permit finished lime to be discharged into the cooling stage. Valve 18 operates in a similar manner on the upper locked chamber or introductory stage 2 during the process of charging fresh stone at the top of the preheating tube.

The $CO_2$ is drawn off by suction action for instance by a positive displacement suction blower or pump 20. It is desirable to cool the hot gas by suitable cooling coil system 21 before the gas enters the blower.

A similar blower or blowers 22 and 23 may be employed to maintain the secondary vacuum system connected to the introductory and cooling stages and the discharge from those stages may be used to supply warmed air to the combustion chamber to effect fuel economy.

In starting the operation the following method of procedure is followed. The stone storage bin 1 is loaded with limestone preferably of small pieces uniformly sized, valves 3 and 3' are open to permit stone to flow by gravity into the preheating tube in sufficient amount, the pocketed wheel or measuring valve 7 being in the closed position. A gas or oil burner in the combustion chamber is turned on and the apparatus is brought to the proper heat for calcining and the suction pumps connected to the primary vacuum system are turned on to develop the correct partial vacuum in the preheating tube and in the calcining tube. Pocketed wheel or measuring valve 7 is revolved by motor at correct speed to allow a predetermined amount of preheated stone to flow from the preheater 4 into the open pocket which is positioned directly below the bottom of the preheater tube 4. As the pocketed wheel or measuring valve 7 slowly revolves the closed portion of the wheel shuts off the flow of stone from the preheater tube 4 and the full pocket of stone passes thru the vertical plane and spills the preheated stone into the calcining stage 10. Said calcining tube 10 is inclined to a degree greater than the angle of repose for the stone of the size being calcined so that the stone will slide or roll slowly down the inclined tube until forced to come to rest by being opposed by the closed portion of the pocketed wheel 8' and the bottom of the tube 10 will be covered with a single layer of unburned limestone. This unburned limestone is allowed to remain stationary for a long enough period of time until the limestone has been fully calcined. At this time pocketed wheel or measuring valve 7' is slowly revolved until an open pocket is exposed to the end of the calcining tube 10 when the calcined quick lime will flow into the open pocket. Pocketed wheels or measuring valves 7 and 7' are geared and connected with drive chain to synchronize their operation so that calcining tube 10 is always covered with stone and the whole charge moves forward down the inclined tube 10 at a rate of speed to allow the stone to remain in the calcining tube long enough to fully calcine the stone and an equal amount is added to the top as is removed from the bottom, in this manner effecting the practically continuous progress of the stone thru the calcining tube.

In operation the charging of fresh stone into the top of the kiln will be in the folowing manner. Valve 3' being closed and valve 18 being open so that the suction pressure of the secondary vacuum system is maintained on chamber 2 then valve 3 is automatically opened long enough to permit a predetermined amount of stone to flow into chamber 2 by gravity after which valve 3 is closed. Secondary system suction will immediately exhaust all the air admitted to chamber 2 at which time valve 3' will be opened to permit stone to flow by gravity into the preheater 4. From here the operation of the pocketed wheels or measuring device to move the stone progressively thru the calcining tube has been described above.

The operation of the valve locked cooling chamber 12 is similar to the operation of the introductory loading lock chamber 2 but operates in reverse order. When pocketed wheel or measuring valve 7' has dumped a predetermined amount of finished lime into reserve chamber 11 valves 13 and 14 and 17 being closed, valve 13 is then opened whereupon the finished quick lime will flow by gravity into cooling chamber 12 and valve 13 is immediately closed and valve 17 in tube 16 opens allowing the secondary vacuum system to draw cold fresh air thru valve 19 which is opened by the suction pressure created in the cooling chamber by the opening of valve 17. When the quick lime has been sufficiently cooled by the fresh air to prevent any further reabsorption of $CO_2$ gas valve 14 is opened and the quick lime flows by gravity onto conveyor 15 and is removed for storage, bagging or shipment as desired.

All valves may be operated mechanically on a timed gear cycle, each synchronized with the others by means of chain or cam drives so that the material being calcined will move forward thru the various stages in the correct time to effect complete calcination of the stone and the elimination of the $CO_2$ gas.

The primary vacuum system is operated by a suitable suction pump operating at a speed to displace the $CO_2$ gas and maintain the desired suction pressure on the several stages and the discharge from the suction pump is carried to a suitable gas holder (not shown) from which it can be distributed as desired.

The secondary vacuum system is operated simply to eliminate the small amounts of air that are admitted to the loading lock chamber in the introductory stage and in the discharge lock chamber during the period when the valve communicating with outside atmosphere has been opened to admit stone or discharge finished quick lime, and will be connected with and operate synchronously with the operation of the other valves.

In this manner I accomplish the progressive uniform heating of the stone as the stone passes through the kiln maintaining a constant suction pressure on the stone during the entire heating period, removing all the $CO_2$ gas as it is evolved from the stone and thereby reducing the temperature required for the complete calcination of the stone and reduction in the total amount of heat required per unit of weight of stone calcined, recovering the pure $CO_2$ gas uncontaminated with the products of combustion and in the highest degree of concentration and without dilution by the admission of air, and cooling the completely calcined quick lime in an atmosphere practically devoid of $CO_2$ gas and preventing the re-absorption by the quick lime of any $CO_2$ gas. Since the stone will all be uniformly and progressively heated without drop in temperature during the entire heating cycle I prevent entirely any recarbonization from taking place and get as results pure CaO and pure $CO_2$ gas with no overburned and no underburned stone or cores and the CaO will have a minimum amount of $CO_2$ gas left in it.

The conduit thru which the stone granules or particles pass is preferably of high temperature alloy or other material which will withstand the wear and temperature. A floor surface or hearth of refractory material may be employed in some cases and may be supported so as to maintain the stone substantially in the center of the conduit so as to take advantage of uniform radiation of heat from the walls of the tube. Although I prefer to employ gravity at least in part for the moving of the stone along the conduit it should be understood that any suitable feed devices or vibrator may be employed to assist the movement through the conduit.

By this process a substantial part of the $CO_2$ is driven off and removed in the so-called lower temperature range of the preheater stage so that the final and substantially complete calcining is accomplished in a much shorter time and at much lower temperature and cost. By progressively heating the stone and forcibly removing the $CO_2$, reabsorption of $CO_2$ is prevented. The $CO_2$ which is driven off in the main heater is sucked out from a point at or near the upper end of the main heater so that gas moves from the hottest toward the cooler end in a direction counter to the flow of the stone. The stone is discharged free from the influence of the $CO_2$ and cooled by air substantially free of $CO_2$ thus producing lime with a minimum $CO_2$ content.

The term limestone is understood as including various classes of lime and carbon-dioxide bearing stone such as calcite, magnesite, dolomite etc.

It will be understood that the products of the process will of course include $CO_2$ and lime containing such additional non-volatile elements as exist in the raw stone.

I claim:

1. A process for producing substantially pure lime and carbon dioxide which comprises passing a thin layer of granulated limestone over the floor of an inclined substantially airtight conduit so as to form a layer of substantially a single thickness of limestone thereon, evacuating the air from said conduit, applying heat uniformly over the outside bottom of said conduit, whereby the granules of limestone are uniformly heated during their passage through said conduit and carbon dioxide is separted from said limestone, withdrawing the carbon dioxide from adjacent the top end of the inclined conduit, withdrawing the lime in an unadulterated condition from the bottom end of said inclined conduit, and cooling said lime with air and out of contact with the carbon dioxide so as to prevent the reabsorption of carbon dioxide.

2. The process of producing lime and carbon dioxide which comprises passing granular material through a substantially airtight conduit having a preheater section and an inclined main heating section, forming said material into a layer of substantially a single thickness of granules on said inclined main heating section, heating the outside of the conduit and progressively and uniformly heating the material passing through the conduit, withdrawing the evolved carbon dioxide independently from the preheater section and the main heating section in a direction counter to the flow of the stone through the conduit and therewith maintaining constant partial vacuum on the stone during the entire heating cycle up to the point of discharge from the conduit, and cooling the lime with air substantially devoid of carbon dioxide to prevent the reabsorption of the carbon dioxide by the cooling lime.

3. The process of producing lime and carbon dioxide which comprises continuously passing granular material through a substantially airtight conduit having an inclined main heater section and a cooling section, forming said material into a layer of substantially a single thickness of granules on said inclined main heater section, heating the outside of the main heater section to progressively and uniformly heat the material passing through the conduit with a minimum differential of degree of heat between the individual pieces of stone and to prevent a drop in temperature of the material during passage through the heating cycle, continuously withdrawing the evolved carbon dioxide gas from the preheater section and from the main heating section in a direction counter to the flow of the stone through the conduit whereby a constant partial vacuum is maintained on the stone during the entire heating cycle up to the point of discharge from the main heater, continuously segregating the finished lime from the unfinished lime, cooling the finished lime with air substantially free of carbon dioxide, discharging the lime from the conduit without disturbing the temperature or pressure conditions in the main heating section and discharging the products of combustion independently of the cooled lime and independently of the evolved carbon dioxide.

4. Apparatus for the heating of calcareous carbonate material comprising a substantially airtight conduit composed of a series of sections through which the material passes successively, said sections being an introductory section, a preheater section, an inclined main heating section and a cooling section, valves arranged between the adjacent sections, separate valved means for applying suction to draw off carbon dioxide gas from the preheater section and from the main heating section, air exhausting means for applying equalizing suction to the introductory section, means for passing cooling air substantially free of carbon dioxide through the material in the cooling section, means for applying equalizing suction to the cooling section, means for heating the outside of the main heating section and the outside of the preheating section, said suction means for carrying off the evolved carbon dioxide being independent of the products of combustion whereby substantially pure carbon dioxide and lime are withdrawn from said conduit.

5. Apparatus for preparing lime and carbon dioxide from limestone comprising a furnace having a stack for combustion gases, a substantially airtight heater conduit having an inclined main heater section and a preheater section within the furnace, and having an introductory air exhausting chamber outside of said furnace, suction means for removing air from said introductory chamber, means for progressively heating the stone as it passes through the two heater sections and thereby driving off carbon dioxide independently of the products of combustion, valved suction means for drawing off carbon dioxide from the preheater section at a relatively low temperature, valved suction means for drawing off carbon dioxide from the upper end of the main section at a relatively high temperature and means for discharging the lime and cooling it in the presence of air substantially free of carbon dioxide.

GEORGE H. HAAS.